United States Patent Office 3,447,813
Patented June 3, 1969

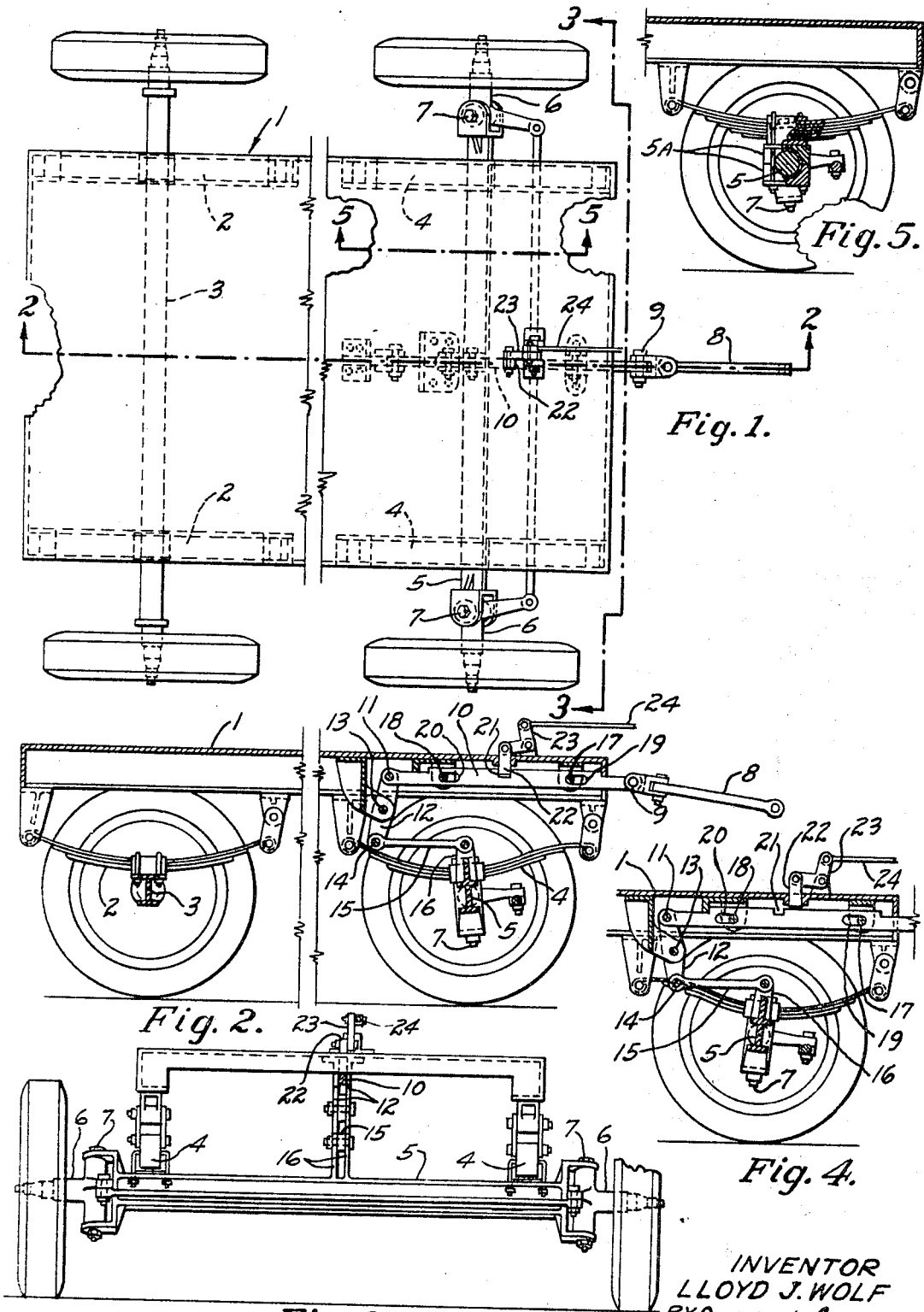

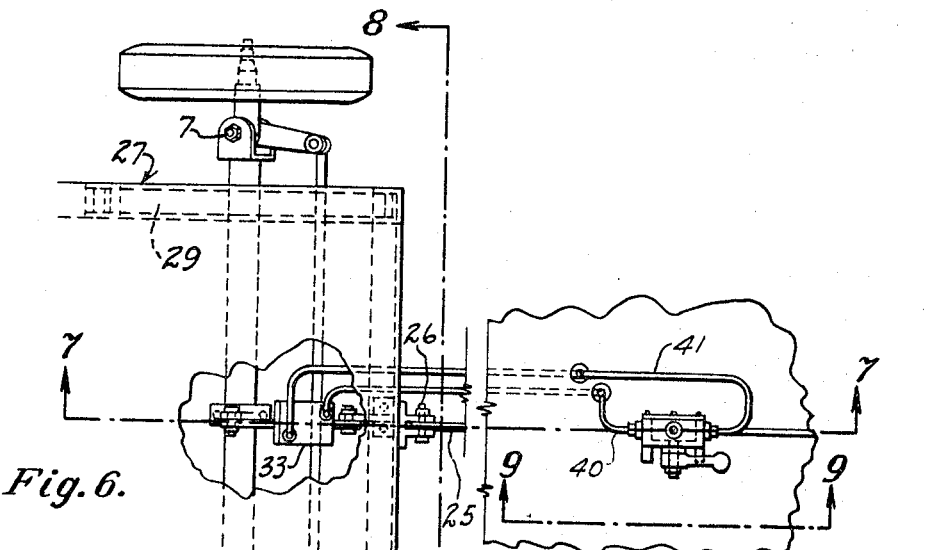
Fig. 6.
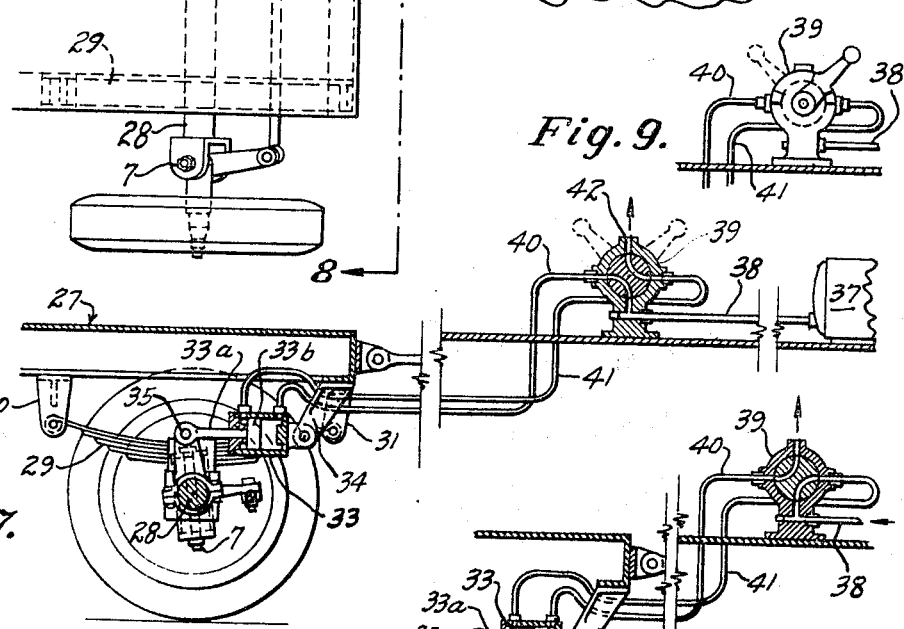
Fig. 7.
Fig. 9.
Fig. 10.
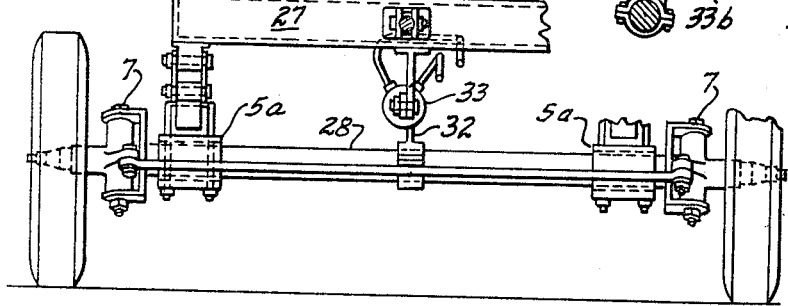
Fig. 8.
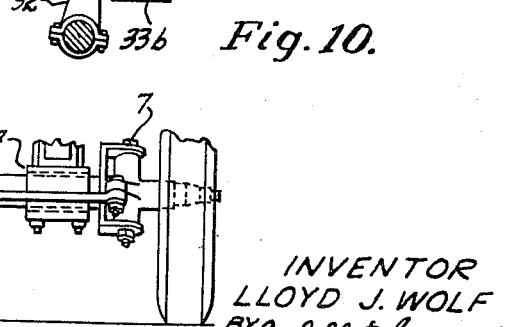
INVENTOR
LLOYD J. WOLF
BY Bedell & Burgess
ATTORNEYS.

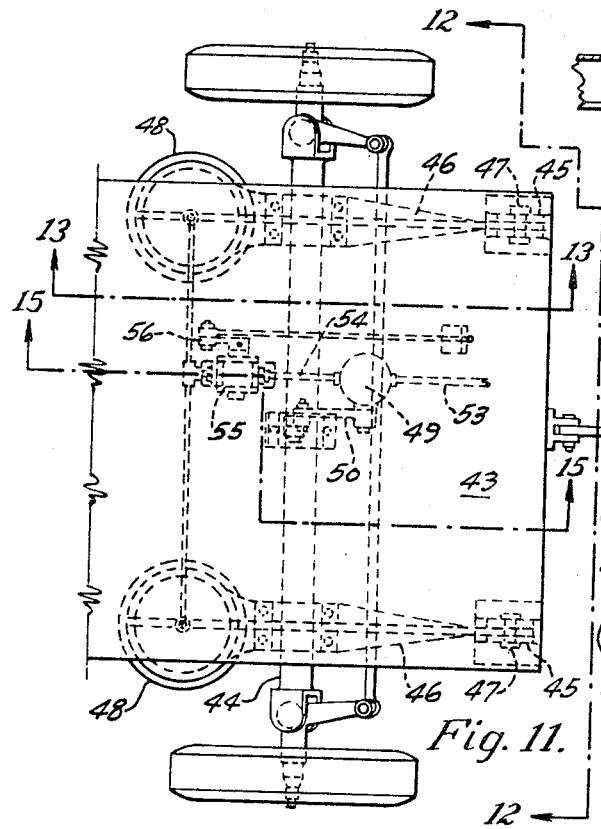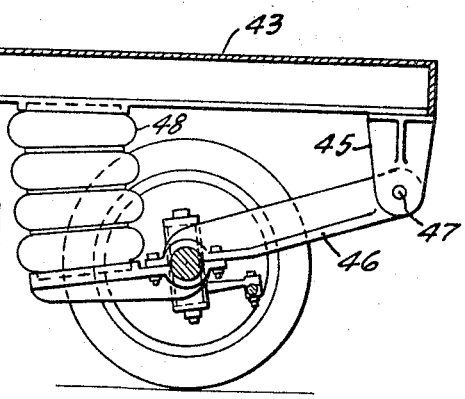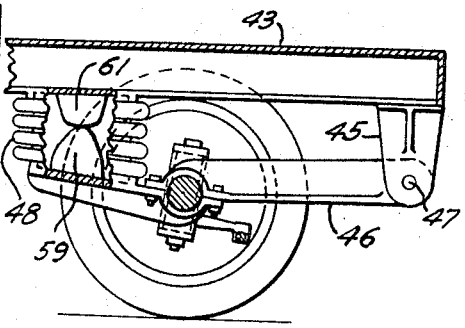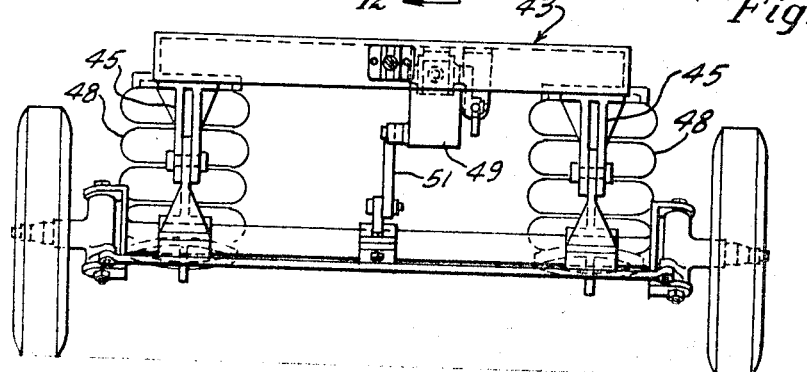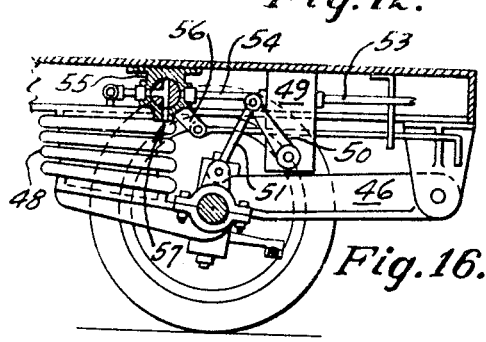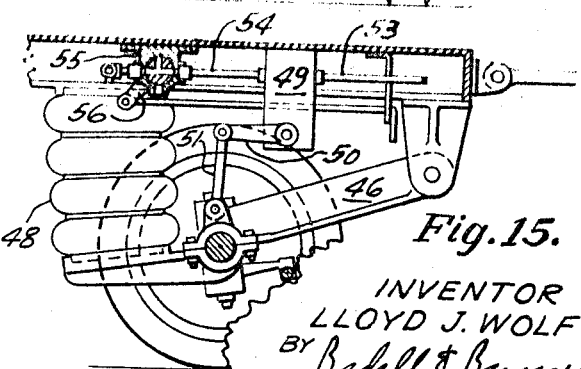

3,447,813
AXLE CASTER-REVERSING MEANS
Lloyd J. Wolf, 2425 Irving Blvd.,
Dallas, Tex. 75207
Filed Jan. 11, 1967, Ser. No. 608,645
Int. Cl. B62d *17/00;* B60b *33/04*
U.S. Cl. 280—80                                         4 Claims

ABSTRACT OF THE DISCLOSURE

Means are provided for reversing the caster of the front wheels of a road vehicle whereby to cause the vehicle to steer properly when pushed rearwardly. The caster is reversed when the axle supporting the front wheels is pivoted or moved about its axis by power means or by linkage means.

---

The invention relates to land vehicles and consists particularly in improved steering means for four-wheel road trailers.

In conventional four-wheel trailers, the normal caster is provided on the front axle, i.e., the kingpins are slightly inclined rearwardly to oppose tendencies of the front wheels to wander from the direction of rectilinear movement and to bias them toward the rectilinear position after a turn. The sideward thrust of the tow bar on the front end of a trailer tends to steer the wheel in the same direction as the thrust because of the normal caster. Conversely however, if a four-wheel trailing vehicle with normal caster is backed up, the effect of the caster is to steer the front wheels in the opposite direction, that of the leading vehicle.

The foregoing and additional more detailed objects and advantages will be evident from the following description and the accompanying drawings, in which:

FIG. 1 is a top view of a four-wheeled vehicle showing one form of the invention.

FIG. 2 is a longitudinal vertical sectional view along line 2—2 of FIG. 1.

FIG. 3 is a front end elevation of the vehicle illustrated in FIG. 1.

FIG. 4 is a longitudinal vertical sectional view along line 2—2 of FIG. 1 of the front end of the vehicle, showing the axle in reverse position.

FIG. 5 is a longitudinal vertical sectional view along line 5—5 of FIG. 1, showing the front axle modified to accommodate a stiffer spring required for heavier vehicles.

FIG. 6 is a top view of the front end of a trailing vehicle and a port on of a leading vehicle showing another embodiment of the invention.

FIG. 7 is a longitudinal vertical sectional view along line 7—7 of FIG. 6.

FIG. 8 is a transverse end view along line 8—8 of FIG. 6.

FIG. 9 is a side view of the control valve illustrated in FIG. 7.

FIG. 10 is a fragmentary longitudinal vertical sectional view line 7—7 of FIG. 6, showing the mechanism in the reverse caster position.

FIG. 11 is a top view of the front end of a vehicle showing a third embodiment of the invention.

FIG. 12 is a front end view along line 12—12 of FIG. 11.

FIGS. 13 and 14 are longitudinal vertical sectional views along line 13—13 of FIG. 11 showing the axle in the normal and reverse caster positions, respectively.

FIGS. 15 and 16 are longitudinal vertical sectional views along line 15—15 of FIG. 11, showing the leveling valve and caster-reversing control means associated therewith.

In FIGS. 1 and 2 the numeral 1 refers to the underframe of a trailer, supported at its rear end by a leaf spring 2 on rear axle 3 and at its front end by a leaf spring 4 on front axle 5 of the automotive type in which the front wheel spindles 6 are pivotally connected by kingpins 7 to the ends of the axle. Kingpins 7 are normally castered, i.e., their axes are substantially upright but slightly inclined rearwardly to facilitate steering in in the forward direction. To provide reverse caster, i.e., forward inclination of the kingpins 7, the vehicle tongue 8, by which it is towed, is pivotally connected at 9 to a bar 10 extending rearwardly from the front of the vehicle to a point rearward of front axle 5. At its rear end, bar 10 is pivotally connected at 11 to the upper end of a level 12, fulcrumed intermediate its ends at 13 to the vehicle frame. The lower end of level 12 is pivotally connected at 14 to a link 15. The latter is connected at its forward end to an upstanding arm 16 on axle 5 so that forward movement of tongue 8 will produce a rearward movement of arm 16 and corresponding rearward rotation of axle 5 with similar inclination of kingpins 7, and rearward movement of tongue 8 will similarly produce a forward inclination of kingpins 7. Rotation of the axle is accommodated by re-arching of springs 4. To provide limits on the maximum inclinations of the kingpins and also for transmitting draft and buff to the trailer, stop pins 17 and 18 are affixed on the vehicle frame for engagement with the ends of cooperating slots 19 and 20 in bar 10. During forward movement, pins 17 and 18 engage the rear ends of slots 19 and 20, limiting forward movement of tongue 8 and transmitting draft forces from the tongue to the vehicle frame, as well as limiting the angle of rearward inclination of kingpins 7 to a desirable value for proper guidance of the wheel. During rearward movement, pins 17 and 18 engage the forward ends of slots 19 and 20, limiting rearward movement of the tongue and transmitting pushing forces from the tongue to the vehicle frame, as well as limiting the angle of rearward inclination of kingpins 7 to a desirable value for proper guidance of the front wheels. For locking bar 10 in its normal forward position, its upper surface is notched at 21 and a pin 22 vertically slidably mounted in the underframe normally seats in notch 21. To permit rearward movement of bar 10 when the vehicle is backed up, pin 22 is pivotally connected to the horizontal arm of a bellcrank 23 fulcrumed on the underframe, and a cable 24 extends forwardly from the vertical arm for actuation by the operator of the leading vehicle.

For larger and heavier vehicles with proportionately stiffer leaf spring suspensions, axle 5 is rotatably mounted in bushing blocks 5a, as seen in FIG. 5 to accommodate its rotation without re-arching of the springs.

In the embodiment illustrated in FIGS. 6–10, tongue 25 is pivoted at 26 direct to the front end of vehicle frame 27, which is suported on front axle 28 by leaf springs 29, brackets 30 and shackles 31. Axle 28 is provided at its center with an upstanding rigid arm 32. Longitudinally extending double-acting fluid pressure cylinder 33 is pivotally secured to a center bracket 34 depending from vehicle frame 27. The piston rod 33a of cylinder 33 is pivotally connected at 35 to arm 32 so that when fluid pressure is applied to the front end of cylinder 33, piston 33b will move to the rear and piston rod 33a will tilt axle 28 rearwardly, providing the normal rearward inclination, or caster of the kingpins for forward movement and, conversely, when fluid pressure is applied to the rear end of cylinder 33, piston 33b will move to the forward end of the cylinder and piston rod 33a will tilt axle 28 forwardly, providing forward or reverse caster for rearward movement of the vehicle.

For selectively providing air to the opposite end of cylinder 33 from the air brake reservoir 37 or other available source, the latter is connected by pipe 38 to a two-position valve 39, whose outlet ports are connected by pipes 40 and 41, respectively, to the forward and rear ends of cylinder 33. For forward movements, valve 39 is in the pisition shown in FIG. 7, passing air from reservoir 37 to the forward end of cylinder 33, and venting the rear end of the cylinder through vent port 42. For rearward movement, the valve is rotated 90°, connecting the rear end of cylinder 33 to the reservoir by means of pipes 41 and 38, and venting the front end of the cylinder to atmosphere via pipe 40 and vent port 42.

In a third embodiment, illustrated in FIGS. 11 and 12, the forward end of vehicle frame 43 is supported at each side on front axle 44 by a suspension comprising a bracket 45 depending from vehicle frame 43, and arm 46 pivoted at 47 to bracket 45 and extending rearwardly and slightly downwardly therefrom past axle 44, on which arm 46 is rigidly mounted. The rear end of arm 46 supports frame 43 by means of upright air cushion 48. Forwardly of cushions 48 a conventional leveling valve 49 of conventional construction is mouted on frame 43 with its operating arm 50 connected by pitman 51 to the axle so that as the overhead distance between frame 43 and the axle decreases, pitman 51 will move valve arm 50 upwardly, causing additional air to pass from air supply line 53 through valve 49 and pipe 54, and as the distance between the axle and frame 43 increases, pitman 51 will move valve arm 50 downwardly, shutting off the supply of air from line 53 to cushion 48, and venting line 54 to atmosphere. Valve 49 would thus maintain air cushion 48 at constant height.

To provide reverse caster for rearward operation, line 54 contains a normally open valve 55 provided with normally closed exhaust port 57 whereby cushion 48 can be disconnected from leveling valve 49 and vented to atmosphere. With this arrangement, before backing up, the operator can utilize lever 56, move valve 55 to the vent position until the height of cushion 48 is reduced sufficiently to incline arm 46 upwardly and the kingpin axes forwardly. To support the load when the air cushions are evacuated, an elastomeric cushion 59 is seated on beam 46 within cushion 48 and a stop member 61 depends from the underframe, also within the cushion, as best seen in FIG. 14.

With all the foregoing arrangements, it will be evident that during rearward operation of the vehicle, caster will be reversed to provide proper guidance for the front wheels.

What is claimed is:
1. In a road vehicle, a longitudinal frame, a front transverse axle supporting the front end of said frame, a draft element connected to said frame and being movable longitudinally thereof, wheel mounting members pivotally connected to said axle on substantially upright axes, and means responsive to movements of said draft element longitudinally of said vehicle frame for pivoting said axle about its axis whereby to change the angle of inclination of said wheel mounting pivot axes longitudinally of the vehicle, said means including linkage means connecting said draft element, and said axle for inclining said axle kingpins rearwardly in response to forward movement of said draft element, and forwardly in response to rearward movements of said draft element, said linkage means including a lever connected at one end to said draft element and fulcrumed intermediate its ends to said vehicle frame, structure rigid with said axle and offset radially from the axis thereof, said lever being connected at its other end to said structure.

2. In a road vehicle according to claim 1, said lever being spaced rearwardly from the adjacent end of said vehicle frame, and a longitudinally extending link forming the connection between said draft element said one end of said lever.

3. In a road vehicle according to claim 2, stop means comprising pairs of opposing transverse surfaces on said vehicle frame and said link for limiting longitudinal movements of said link whereby to transmit draft and pushing forces from said draft element to said vehicle frame and to correspondingly limit forward and rearward inclinations of said pivot axes.

4. In a road vehicle according to claim 1, stop means limiting pivotal movements of said axle about its axis and forward and rearward inclinations of said pivot axes and transmitting draft and pushing forces from said draft element to said vehicle frame.

References Cited
UNITED STATES PATENTS

| | | | |
|---|---|---|---|
| 2,644,697 | 7/1953 | Peterson | 280—80 |
| 2,674,463 | 4/1954 | Peterson | 280—80 |
| 2,674,464 | 4/1954 | Peterson | 280—80 |
| 2,831,699 | 4/1958 | Holmes | 280—80 |
| 1,524,136 | 1/1925 | Kapfrerer et al. | 280—136 |
| 1,712,063 | 5/1929 | Agramonte. | |
| 2,377,641 | 6/1945 | Miner. | |
| 2,847,228 | 8/1958 | Hall | 280—81 |
| 3,186,733 | 6/1965 | Langehennig | 280—446 |

KENNETH H. BETTS, *Primary Examiner.*

U.S. Cl. X.R.

280—446

UNITED STATES PATENT OFFICE
CERTIFICATE OF CORRECTION

Patent No. 3,447,813 June 3, 1969

Lloyd J. Wolf

It is certified that error appears in the above identified patent and that said Letters Patent are hereby corrected as shown below:

Column 4, line 9, "element," should read -- element --; same line 9, "axle", second occurrence, should read -- axes --.

Signed and sealed this 14th day of April 1970.

(SEAL)
Attest:

Edward M. Fletcher, Jr.  WILLIAM E. SCHUYLER, JR.
Attesting Officer  Commissioner of Patents

UNITED STATES PATENT OFFICE
CERTIFICATE OF CORRECTION

Patent No. 3,447,813                                            June 3, 1969

Lloyd J. Wolf

It is certified that error appears in the above identified patent and that said Letters Patent are hereby corrected as shown below:

Column 4, line 10, cancel "kingpins".

Signed and sealed this 22nd day of December 1970.

(SEAL)
Attest:

Edward M. Fletcher, Jr.
Attesting Officer

WILLIAM E. SCHUYLER, JR.
Commissioner of Patents